United States Patent Office 3,278,984
Patented Oct. 18, 1966

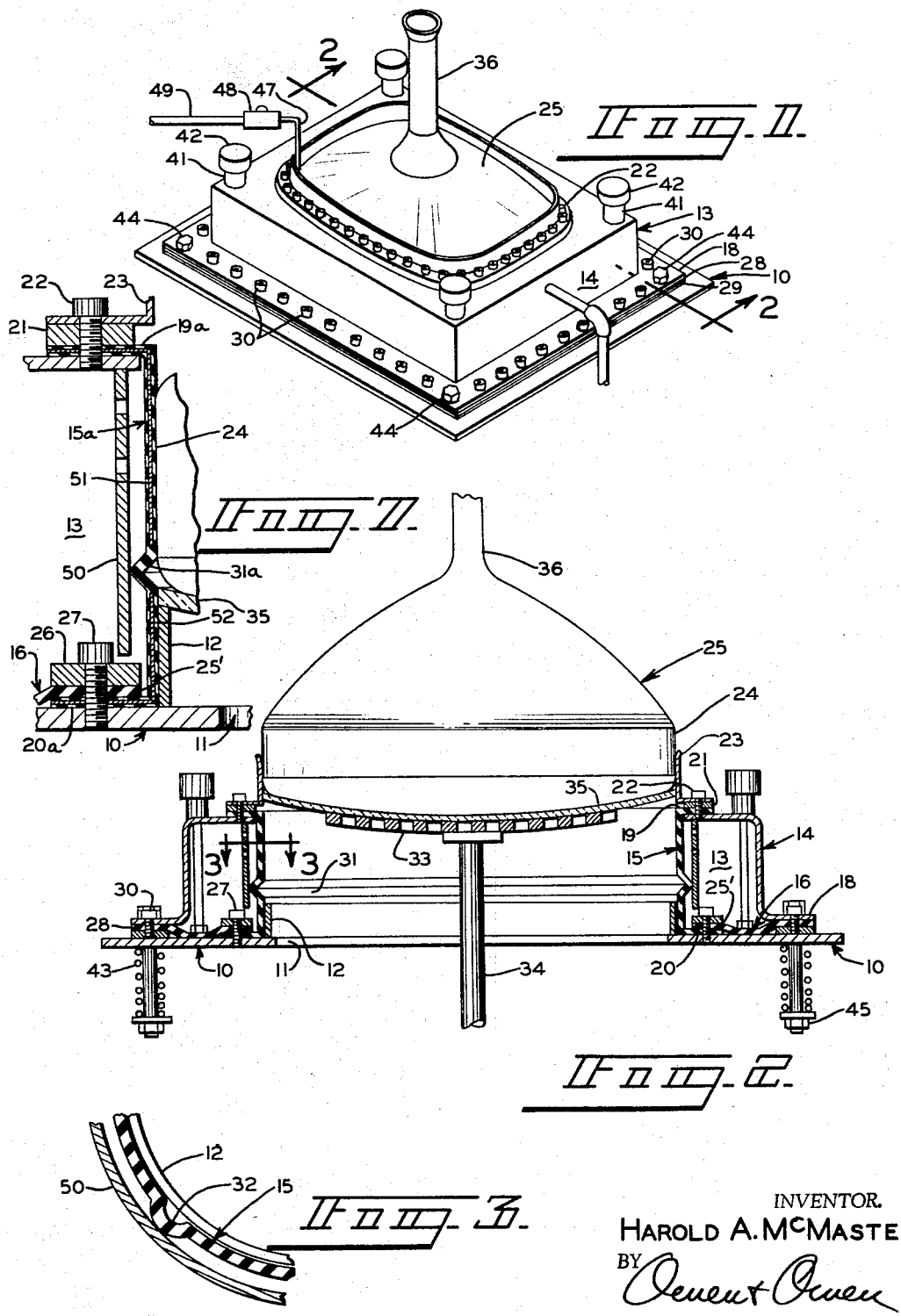

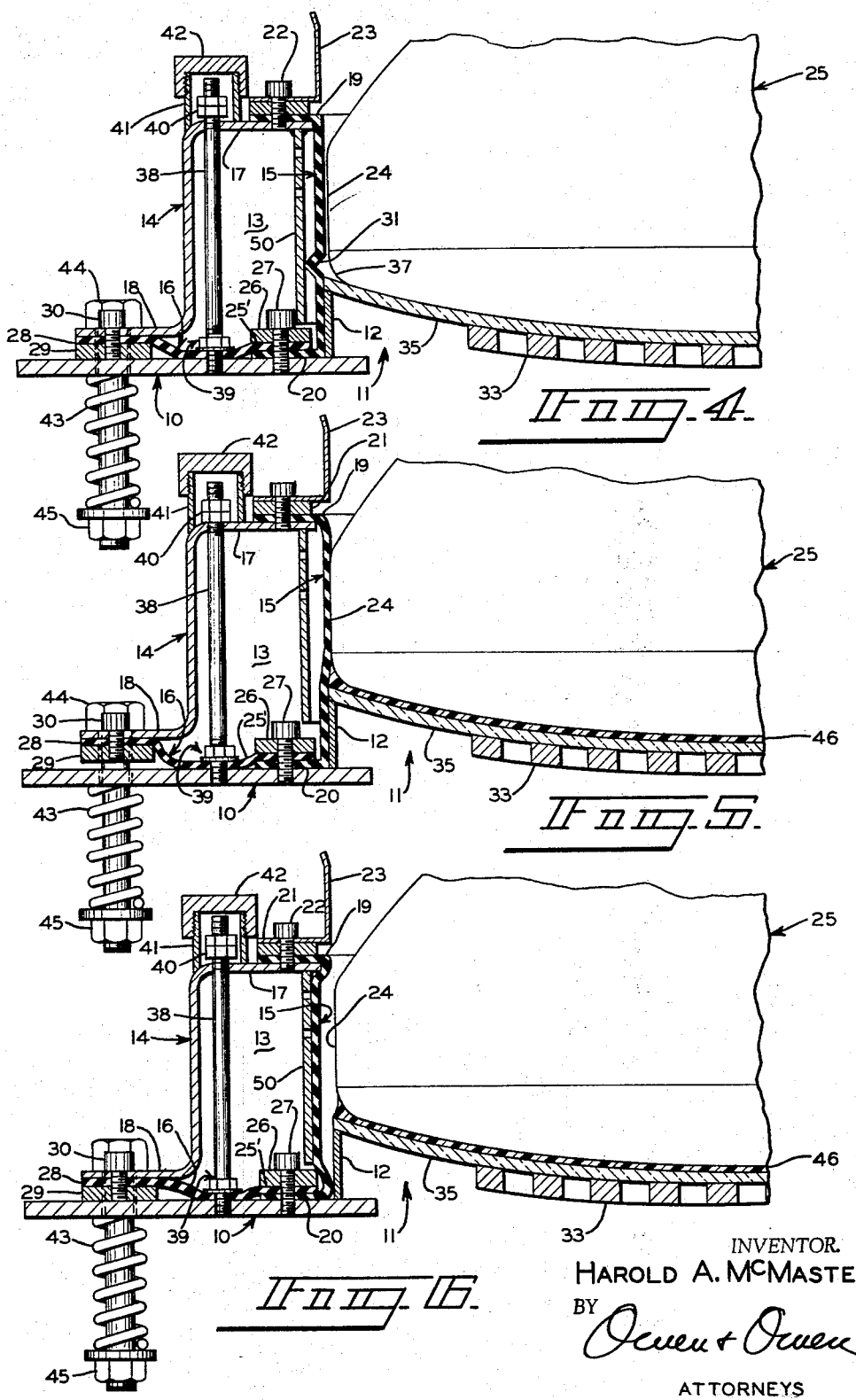

3,278,984
APPARATUS FOR POSITIONING GLASS PLATES DURING LAMINATING
Harold A. McMaster, Woodville, Ohio, assignor, by mesne assignments, to Pittsburgh Plate Glass Company, Pittsburgh, Pa., a corporation of Pennsylvania
Filed Nov. 27, 1961, Ser. No. 155,066
10 Claims. (Cl. 18—5)

This invention relates to an apparatus for positioning glass plates during laminating and more particularly to an apparatus for establishing and maintaining controlled spacing between the front of a television viewing tube and a face or implosion plate which is to be laminated to the tube by the use of an inter-layer of resinous material.

It has been discovered during the years of development of television viewing tubes that it is essential to protect the face of the television viewing tube with an implosion plate and that such a plate preferably should be fabricated from tempered glass in order that it may be tough enough to resist the forces incurring upon implosion or upon other damage to the tube, which would otherwise result in flying shards of glass which might injure assembly operators or viewers.

One way of providing such protection is to laminate the implosion plate to the television tube by the use of a synthetic resin and that a successful lamination requires a minimum layer of, say, some .040 inch of resinous adhesive between the outer surface of the television tube itself and the inner surface of the implosion plate.

Because the television tube is fabricated by an assembly of several individual glass elements, viz. the front plate which often is fabricated from a high lead content glass to inhibit the passage of X-rays, the funnel and the neck, both of which are fabricated from glasses compounded to facilitate welding to each other and to the tube face, it is extremely difficult to hold the television tube and its face within close tolerances as to its curvature in both directions across the face. Because the implosion plate for a laminated structure is a tempered, curved sheet of glass, it is also difficult to hold precise tolerances in the curvature of such plates. For these reasons, the curvature of the surface of the television tube and the inner surface of the implosion plate do not precisely match—there are variations often as much as, say, .050 inch at various places between these two surfaces. As mentioned above, it is desirable that there be a minimum thickness of about .040 inch of the inter-resinous layer in order to provide for a suitable adhesion between the implosion plate and the tube face. Apparatuses and processes for spacing the implosion plate from the tube face and maintaining the spacing have tended to be extremely cumbersome and expensive.

In addition it is necessary to provide some means to serve as an edge boundary for the space between the tube face and the plate in order to confine the laminating resin therebetween during filling and setting. The only effective commercial apparatus previously developed has used a single use tape which is wrapped around the edge of the implosion plate sealing it to the shoulder of the television tube in order to bound the space therebetween. It is not only expensive to construct and operate apparatus for automatically wrapping the tape around the edge of the tube and face plate but the cost of the tape itself is not insignificant.

It is the principal object of the instant invention to provide a simple apparatus for separating an implosion plate from the face of a television tube a measured minimum distance, for forming a boundary for the space between the face of the tube and the implosion plate to limit the flow of resin thereinto and for maintaining the implosion plate and tube face in their spaced relationship during the setting up of the resinous inner layer.

It is yet another object of the instant invention to provide a unitary apparatus operating according to the invention, the apparatuses being repetitively useable in an assembly line and the apparatus be so designed as to travel around the assembly line between stations; for example, to a first loading station for the implosion plates, the second loading station for the television tubes themselves, a third station for spacing of the plate and tube and injection of the resinous inter-layer, a fourth station or rest position to allow setting up of the resin and a fifth station where the laminated tube and face plate is unloaded from the particular apparatus, the apparatus then returning to the first station for the reception of a subsequent implosion plate and television tube.

These and other more specific objects and advantages of an apparatus embodying the invention will be better understood from the specification which follows and from the drawings in which:

FIG. 1 is a view in perspective and on a small scale of a single apparatus embodying the invention and operating according to the method of the invention, the apparatus being shown at the resin injection station of an assembly line;

FIG. 2 is a vertical sectional view taken generally along the line 2—2 of FIG. 1 but showing the apparatus in position for the reception of an implosion plate and a television tube prior to their spacing;

FIG. 3 is a fragmentary horizontal view taken along the line 3—3 of FIG. 2 and shown on an enlarged scale;

FIG. 4 is a fragmentary vertical sectional view, being an enlargement of the left-hand portion of FIG. 2 and showing the apparatus with an implosion plate and a television tube at operative position in the interior thereof;

FIG. 5 is a view similar to FIG. 4 but showing the apparatus, an implosion plate and a televison tube at the time of spacing and injection of the inter-resinous layer;

FIG. 6 is a view similar to FIGS. 4 and 5 but showing the apparatus, the implosion plate and television tube after bonding of the implosion plate to the television tube and just prior to removal of the laminated plate and tube from the apparatus; and FIG. 7 is a fragmentary view similar to a portion of FIGS. 4, 5 and 6 but showing a modification of certain parts of the apparatus of the invention.

The use of the apparatus of this invention involves the following steps:

(1) A completed television tube envelope (A) having a curved face and a preformed, curved implosion plate (B) fabricated, for example, from tempered glass, are brought into face-to-face contact within a circumjacent perimeter element. Because of the inability of manufacturing processes to produce identical curvatures throughout the surfaces of the face of the television tube and the inner face of the implosion plate, these two contact each other at three points somewhere upon their surfaces.

(2) The perimeter element is constructed normal to the axis of the tube to tightly grasp the edge of the implosion plate and the shoulder of the television tube.

(3) The perimeter element is stretched or elongated axially of the television tube; i.e., generally perpendicularly to the generally parallel faces of the tube and the implosion plate, a distance sufficient to produce a minimum measured spacing between any portions of the face of the television tube and the implosion plate.

(4) While maintaining the television tube and implosion plate at the selected spacing and while the perimeter forming means functions to close off the outside boundaries of the space thus maintained, the resinous material for forming the inter-layer is injected into the space.

(5) The perimeter forming means is maintained with the tube face and implosion plate in spaced relationship until the resin sets up.

(6) The perimeter element is expanded and the laminated implosion plate and tube are removed.

(7) The perimeter element is relaxed preparatory to the reception of a subsequent tube and implosion plate to be laminated thereon.

Apparatus embodying the invention and suitable for the carrying out of the steps just described above is illustrated in the drawings and comprises, among other parts, an open centered base plate generally indicated by reference number 10. The base plate 10 is fabricated from relatively heavy gauge metal and may be rectangular in shape, having a central opening generally indicated by the reference numeral 11. The center opening 11 of the base plate 10 is bounded by a vertical spacing ring 12 which functions as a rest for an implosion plate to be laminated to a television tube as will later be described.

The base plate 10 primarily serves as a mounting for a chamber generally indicated at 13, the chamber 13 being formed by an outer metal wall 14, an inner perimeter forming element 15 and a bottom gasket 16. The outer metal wall 14 has an inwardly turned top flange 17 and an outwardly turned bottom flange 18. The perimeter forming element 15 has a top flange 19 turned outwardly and overlying the inner edge of the top flange 17 of the outer metal wall 14 and also has an outwardly directed bottom flange 20. The upper flange 19 of the perimeter element 15 is vulcanized, adhered or otherwise suitably sealed to the flange 17 of the metal wall 14 and held in place by a clamping ring 21 which is tightened against the flange 17 of the metal wall 14 by a plurality of cap screws 22. The cap screws 22 also hold a guide ring 23 which has an upwardly directed wall, flaring slightly outwardly, of such size as to relatively closely fit a generally tubular shoulder portion 24 of a television tube generally indicated by the reference number 25, in order to guide the tube 25 into the space within the perimeter element 15.

The bottom flange 20 of the perimeter element 15 and an inner edge 25' of the bottom gasket 16 are both tightly clamped and sealed to the base plate 10 by a clamping ring 26. The clamping ring 26 is held in place by a plurality of cap screws 27 which are threaded into the base plate 10. An outer edge 28 of the bottom gasket 16 is clamped between the bottom flange 18 of the metal wall 14 and a clamping ring 29 by a similar group of cap screws 30.

The chamber 13 is thus bounded and hermetically sealed by the outer wall 14 with its top and bottom flanges 17 and 18 which are sealed, respectively, to the top flange 19 of the perimeter element 15 and the outer flange 28 of the bottom gasket 16 and by the inner edge 25' of the gasket 16 and bottom flange 20 of the perimeter element 15 which are bonded and tightly clamped together by the clamping ring 26.

The perimeter forming element 15 is a molded element formed from a tough rubbery material, natural or synthetic, and is molded to provide an outwardly protruding groove 31 which extends horizontally around the perimeter forming element 15 at a level slightly above the upper edge of the spacing ring 12. The perimeter forming element 15 also has several, at least two, vertically extending grooves 32 (see FIGURE 3, particularly) which are molded at its arcuate corners and which lead upwardly from the groove 31 to the upper shoulder between the vertical wall of the perimeter element 15 and its top flange 19.

Referring now to FIGS. 2, 4, 5 and 6, in that order, the apparatus embodying the invention is operated as follows.

A loading pedestal 33 (FIG. 2) is mounted upon a vertically movable post 34 and, when it is desired to load an apparatus embodying the invention, the pedestal 33 is moved upwardly to the position indicated in FIG. 2. The operator then places a preformed and tempered implosion plate 35 on the pedestal 34, centering it by the guide ring 23 and inverts a television tube 25 so that its neck 36 is directed upwardly, placing the front face of the television tube 25 on the implosion plate 35 which is resting upon the pedestal 33. Because of the non-mating surfaces of the face of the television tube 25 and the implosion plate 35 as discussed earlier, the two usually contact each other at only three points on their surfaces. The guide ring 23 functions also to orient the television tube 25 relative to the edges of the implosion plate 35 so that they are aligned with each other adequately for all purposes.

The operator lowers the pedestal 33 moving the implosion plate 35 and television tube 25 downwardly to the position illustrated in FIG. 4 and until the implosion plate 35 rests upon the upper edge of the spacing ring 12. At this point the edge of the implosion plate 35 is just below the groove 31 in the perimeter element 15 and the shouldered portion 24 of the television tube 25 is located just above the groove 31. The width of the groove 31 is such that it extends vertically a distance approximately equal to the vertical extent of a curved corner, indicated by the reference number 37, where the face of the television tube 25 is blended into and welded to the shoulder portion 24 of the tube 25.

The operator then admits air into the chamber 13. Air pressure in the chamber 13 squeezes or constricts the perimeter element 15 inwardly into tight friction contact with the shoulder portion 24 of the television tube 25 and into sealing contact with the edge of the implosion plate 35 as illustrated in FIG. 5. Because the outer edge of the bottom gasket 16 and the metal wall 14 are not connected to the base plate 10 air pressure in the chamber 13 also moves the metal wall 14 upwardly, due to the flexibility of the gasket 16, as also is illustrated in FIG. 5 and because of the frictional engagement of the upper section of the perimeter element 15 with the tube 25, the tube 25 is also moved upwardly away from the implosion plate 35.

The distance of upward movement of the metal wall 14 and is adjusted and determined by four stops each of which comprises a stop rod 38, the lower end of which is threaded into the base plate 10 and which has a nut and washer 39 functioning to clamp the bottom gasket 16 to the base plate 10. The upper end of each of the stop rods 38 extends through an opening in the top flange 17 of the metal wall 14 and is threaded for the reception of adjustment nuts 40. The upper end of the stop rod 38 and the adjustment nuts 40 are enclosed within a pipe nipple 41 welded or otherwise tightly sealed to the flange 17 of the metal wall 14 and closed by a pipe cap 42. By comparing FIGS. 4 and 5 it can be seen that in the rest position of FIG. 4 a vertical space exists between the lowermost one of the adjustment nuts 40 and the upper surface of the flange 17 of the metal wall 14 and that in FIG. 5 the metal wall 14 and its upper flange 17 have been moved upwardly until the upper surface of the flange 17 is in contact with the lower adjustment nut 40. Simultaneously, of course, the bottom flange 18 of the metal wall 14 moves upwardly carrying with it the clamping ring 29.

In order to provide for the constriction of the perimeter element 15 into tight frictional engagement with the perimetrical surface of the tube 25 before upward movement of the outer metal wall 14, adjustable restraining springs 43 are provided. Each of the four restraining springs 43 is located at one of the four corners of the base plate 10 and surrounds the shank of a bolt 44 which extends through enlarged openings (not shown) in the flange 18, the edge 28 of the gasket 16, the clamping ring 29 and the base plate 10. A nut 45 is threaded on the lower end of each of the bolts 44 in order to adjust the compression on the restraining spring 43. Once the restraining force of the springs 43 has been set for a particular perimeter element 15, expansion of the perimeter element relative to the chamber 13, i.e., its inward constriction, thereafter precedes the vertical movement of its upper section.

During the movement of the outer metal wall 14 and associated parts and the television tube 25 from the position of FIG. 4 to the position of FIG. 5, the groove 31 in the perimeter element 15 is straightened out by a combination of mechanical vertical stretching and air pressure acting against the perimeter element 15 from a chamber 13. The perimeter element 15 is illustrated in this straightened out condition in FIG. 5 and it will be seen that, in straightening out, the groove 31 is substantially eliminated so that the perimeter element 15 not only constricts tightly around both the television tube 25 and the edge of the implosion plate 35, but also bridges the space between the television tube 25 and the implosion plate 35. The plate 35 is held down by the gripping of the lower portion of the perimeter element 15 below the groove 31. By properly adjusting the nuts 45 and thus the compression of the restraining springs 43, the upward rate of movement of the television tube 25 is controlled and thus no shock and likelihood of damage is experienced. Adjustment of the nuts 40 on the upper ends of the stop rods 38 determines the maximum upward movement of the outer metal wall 14 and thus the maximum movement of the television tube 25 upwardly from the implosion plate 35 upon which it rests in the position illustrated in FIG. 4. This distance (which is shown as filled with resinous material indicated by the reference number 46 in FIG. 5) is usually set for a minimum of .040 inch between the positions of FIG. 4 and FIG. 5. An apparatus embodying the invention and operated according to the method of the invention has been found to repeat its upward movement of the television tubes 25 within a tolerance of .001 inch as measured by measuring the vertical movement of the tube 25 itself relative to a fixed position in space. By properly adjusting the several restraining springs 43 and the stop rods 38, all four sides of the television tube 25 are brought up a uniform distance relative to the position shown in FIG. 4 for the establishment of clearance space between the outer face of the television tube 25 and the inner face of the implosion plate 35 with any minimum selected within the operating range.

When the television tube 25 and implosion plate 35 are in the position illustrated in FIG. 5, the operator inserts a nozzle 47 (see FIG. 1) which is connected through a valve 48 to a resin supply line 49. The line 49 is connected to a suitable source of liquid resin under pressure, for example a polyester resin having an affinity for bonding the face of the television tube 25 to the implosion plate 35. The nozzle 47 is inserted downwardly through one of the vertical grooves 32 until its end reaches the level of the horizontal groove 31 in the perimeter element 15. The operator then discharges resin through the nozzle 47 into this space defined by the face of the television tube 25 and the inner face of the implosion plate 35 and by the perimeter element 15 around its edges. By shining a light upwardly from beneath the pedestal 33 and through openings therein, the light passes through the implosion plate 35 and into the tube 25 and the operator can watch the liquid resin as it flows across through the space between the face of the tube 25 and the implosion plate 35. The resin drives the air before it with the air bleeding out of this space through the other vertical groove or grooves 32 and fills the space between the face of the television tube 25 and the implosition plate 35 outwardly to the borders provided by the perimeter element 15. Prior to operation, of course, the inner surface of the perimeter element 15 may be coated with a suitable parting material, for example, one of the many silanes, in order to prevent adhesion of the resin to the perimeter element 15. After the space is filled with the resinous material 46, the entire unit is moved to a rest station where sufficient time is allowed to pass for the resin in the layer 46 to set up, at least to a degree sufficient to preclude shifting or separation of the laminated structure.

After this time the chamber 13 is connected to a vacuum source and the pressure in the chamber 13 reduced to below atmospheric. This condition is illustrated in FIG. 6 where low pressure interiorly of the chamber 13 is shown as having caused the perimeter element 15 to be expanded away from the television tube 25 and the implosion plate 35 outwardly against a perforated retainer 50 which is a flat ring of metal welded at its upper end to the underside of the top flange 17 of the metal wall 14. With the perimeter element 15 expanded as illustrated in FIG. 6 it is out of contact with the television tube 25 and implosion plate 35, and the operator can then raise the pedestal 33 to lift the television tube 25 with its laminated implosion plate 35 upwardly to the position illustrated in FIG. 2 and the laminated television tube 25 can be removed from the apparatus to be replaced by a subsequent implosion plate 35 and tube 25 to be put through the cycle just described.

FIG. 7 is a fragmentary illustration of a slightly modified form of perimeter element indicated by the reference number 15a which is provided with reinforcing fingers 51 and 52. The fingers 51 are molded into the interior of the perimeter element 15a and extend upwardly from the upper edge of its groove 31a to and through its top flange 19a. The fingers 52a are similarly molded into the perimeter element 15a extending from the lower edge of its groove 31a downwardly into its bottom flange 20a. The fingers 51 and 52, which may be formed of any metal which can be bonded into the perimeter element 15a, have the function of preventing stretching of the portions of the perimeter element 15a above and below the groove 31a to thus preclude any possibility of slippage between the perimeter element 15a and the shoulder 24 of the television tube 25 or the edge of the implosion plate 35.

Having described my invention, I claim:

1. Apparatus for laminating a television tube face and an implosion plate, said apparatus comprising a base plate having a central opening of a size and shape loosely conforming to the size and shape of said tube face and said implosion plate, a fluid chamber mounted on said plate and extending perimetrically around such opening, said chamber having a rigid top wall generally parallel to said base plate and spaced therefrom, an inner perimeter element extending between and continuously connected to said base plate and said rigid wall and having a size to loosely circumscribe the edge of said implosion plate and other walls connected to said rigid top wall and said perimeter element for closing off said chamber, means for supporting said implosion plate within the confines of said perimeter element and said television tube in inverted position and face-to-face contact with said implosion plate, said perimeter element having a width axially of said television tube sufficient to extend circumjacently to a perimetrical surface of said television tube adjacent its face and to the edge of said implosion plate and having a first section overlying said perimetrical surface of said television tube, a second section overlying said edge of said implosion plate and an intermediate section extending therebetween, at least said intermediate section being flexible and providing for relative movement of said first and second sections both radially of said television tube and relative to each other axially of said television tube, means for guiding and adjustably limiting the movement of said rigid top wall in a direction axially of said tube, and means for raising the pressure in said chamber above atmospheric and for lowering such pressure below atmospheric, whereby raising such pressure above atmospheric constricts said first and second sections of said perimeter element into frictional engagement with said television tube and with the edge of said implosion plate, respectively, and moves said rigid top wall and said first section of said perimeter element away from said second section for separating the face of said tube away from the face of said implosion plate a distance determined by said adjustable limiting stop means, and lowering such pressure below atmospheric expands said perimeter element for releasing said television tube and said implosion plate.

2. Apparatus for laminating a pair of objects having generally complementary surfaces comprising a structure having a perimeter element defining an opening conforming closely in size and shape to the perimetrical surfaces of said objects, means for supporting said objects within said opening with said complementary surfaces in face-to-face contact, means for constricting said perimeter element into frictional engagement with the perimetrical surface of one of said objects and into sealing contact with the perimetrical surface of the other of said objects, means for extending the portion of said perimeter element lying between the portion in frictional engagement with said one of said objects and the portion in sealing engagement with said other of said objects in a direction for separating said objects a predetermined distance, means for filling the space between said complementary surfaces with a laminating resin and means for expanding said perimeter element away from said objects.

3. Apparatus for laminating a pair of objects having generally complementary surfaces comprising a structure having a perimeter element defining an opening, means for supporting said objects within said opening with said complementary surfaces in face-to-face contact, means for constricting said perimeter element into frictional engagement with the edge of one of said objects and into sealing engagement with the edge of the other of said objects, means for extending the portion of said perimeter element bridging across the complementary surfaces of said objects in a direction for separating said objects a predetermined distance, means for filling the space between said objects with a laminating resin and means for expanding said perimeter element away from said objects.

4. Apparatus for laminating a pair of objects having generally complementary surfaces located in face-to-face relationship comprising a structure having a perimeter element defining an opening, means for supporting said objects with said complementary surfaces in contact within said opening, said perimeter element having a first section circumjacently surrounding a perimetrical surface of one of said objects, a second section circumjacently surrounding a perimetrical surface of the other of said objects, and an intermediate section extending therebetween, means forming a part of said intermediate section to permit relative movement of said first and said second sections, means for constricting said perimeter element into frictional engagement with said perimetrical surface of said one of said objects and into sealing engagement with said perimetrical surface of said other of said objects, means to provide relative movement between said first and said second sections of said perimeter element for separating said complementary surfaces of said objects a predetermined distance and for extending said intermediate section, means for filling the space between said complementary surfaces with a laminating resin and means for expanding said perimeter element away from said objects.

5. Apparatus for laminating a generally complementary implosion plate to the face of a television tube, said apparatus comprising a structure having a perimeter element defining a vertical opening conforming closely in size and shape to the perimetrical surface of said tube adjacent its face and the edge of said implosion plate, a closed fluid chamber extending around the opening defined by said perimeter element, said perimeter element forming the fourth and innermost wall thereof, means for supporting said tube and said plate within said opening and in face-to-face contact, fluid pressure means for constricting said perimeter element into frictional engagement with said perimetrical surface of said tube, means for extending said perimeter element in a direction axially of said tube for separating said tube face and said implosion plate a predetermined distance, means for filling the space between said tube face and said implosion plate with laminating resin and means for expanding said perimeter element away from said tube.

6. Apparatus for laminating a television tube face and a complementary implosion plate, said apparatus comprising a perimeter element of a size and shape adapted to fit circumjacently around at least the shoulder portion of said tube, said perimeter element being an elastic band forming the inside wall of a closed fluid chamber extending peripherally around the outside thereof, means for supporting said implosion plate and said tube in face-to-face contact and interiorly of said perimeter element, means for raising the pressure in said chamber above atmospheric for constricting a first section of said perimeter element into tight frictional engagement with the adjacent perimetrical surface of said tube, means comprising a second section of said perimeter element for sealing between said first section of said perimeter element and the edge of said implosion plate, means comprising a third section of said perimeter element intermediate said first and second sections for bridging therebetween and defining the edge of the space between said tube face and said implosion plate after separation thereof, means for extending said intermediate perimeter element and for moving said first section of said perimeter element in a direction axially of said tube and relative to said implosion plate for separating said tube face and said implosion plate a predetermined distance, and means for feeding a suitable laminating resin into the space between the separated faces of said tube and implosion plate and for filling such space therewith, and means for expanding said perimeter element out of engagement with said tube and for breaking the seal between said perimeter element and said implosion plate.

7. Apparatus according to claim 6 including means for restraining said second section of said perimeter element against movement in a direction axially of said tube for retaining said implosion plate in fixed position when said tube is moved axially thereof.

8. Apparatus according to claim 6, in which the third intermediate section of said perimeter element comprises a fold in said perimeter element and movement of said first section of said perimeter element for separating said tube face and said implosion plate straightens out said fold.

9. Apparatus for laminating a first object having a first surface to a second object having a surface generally complementary to said first surface of said first object, said apparatus comprising a structure having a perimeter element defining an opening, means for supporting said first and second objects with said complementary surfaces in contact within said opening, means for constricting said perimeter element inwardly into frictional engagement with the adjacent perimetrical surface of a first of said objects to be laminated, means for sealing between said perimeter element and the adjacent perimetrical surface of the second object to be laminated, means for extending said perimeter element intermediate said first and second objects for moving the portion of said perimeter element frictionally engaged with said first object in a direction axially with respect to said generally complementary surfaces for separating the surfaces of said objects a measured distance, means for filling the space between said complementary surfaces with a laminating adhesive, and means for expanding said perimeter element away from said objects, 10. Apparatus for precision laminating a first surface of a first object to a generally complementary surface of a second object, said apparatus comprising a structure having a perimeter element defining an opening, means for supporting said first and second objects with said complementary surfaces in contact within said opening, means for constricting said perimeter element into frictional engagement with the adjacent edge of one of said objects, means for sealing between said edge of said one of said objects and the edge of the other of said objects, means for extending said perimeter element intermediate said first and second objects for moving the portion of said perimeter element frictionally engaged with said edge of said first object in a direction axially with respect to said generally complementary surfaces for separating the surfaces of said objects a measured distance, means for filling the space between said complementary surfaces with a laminating adhesive, and means for expanding said perimeter element away from said objects.

References Cited by the Examiner

UNITED STATES PATENTS 3,007,833  11/1961  Jackman _____ 156—305 XR
3,075,870  1/1963   Hedler et al. _____ 264—262

ROBERT F. WHITE, *Primary Examiner.*

EARL M. BERGERT, *Examiner.*

M. E. ROGERS, L. S. SQUIRES, *Assistant Examiners.*